June 15, 1937. V. V. COLAIACE 2,083,637
LATCH FOR INTERCHANGEABLE LENS MOUNTS
Filed Feb. 4, 1936

INVENTOR.
Victor V. Colaiace,
BY
ATTORNEYS.

Patented June 15, 1937

2,083,637

UNITED STATES PATENT OFFICE 2,083,637

LATCH FOR INTERCHANGEABLE LENS MOUNTS

Victor V. Colaiace, Rochester, N. Y., assignor, by mesne assignments, to Eastman Kodak Company, Jersey City, N. J., a corporation of New Jersey Application February 4, 1936, Serial No. 62,322

6 Claims. (Cl. 95—53)

This invention relates to photography and more particularly to a latch for releasing a removable lens mount from a locked position on photographic apparatus, such as cameras or projectors.

One object of my invention is to provide a latch member which is permanently fastened to a removable lens mount so that it can be easily operated to effect a release of the locking means between the lens mount and the photographic apparatus on which it is mounted. Another object is to provide a latch which is simple and efficient. And still another object is to provide a latch of small and pleasing contour so that when it is permanently fixed to a removable lens mount it will add a finished and neat appearance thereto.

My latch is adapted to provide a lock releasing means when used in conjunction with removable lens mounts which are locked in position on a camera by having a spring pressed plunger, which extends through said camera wall, adapted to engage an aperture in the base plate of the lens mount to prevent any relative rotation of the two with respect to one another. The latch, as shown, consists of a casing which is mounted on the base plate in covering position relative to the aperture therein, and a suitably milled block having a cam face is slidably mounted in said casing and normally spring pressed to a position wherein the spring pressed plunger is allowed to enter the aperture in the base plate and extend into the casing covering said aperture. Then, by sliding the cam faced block against a spring pressing means the spring pressed plunger is cammed out of the aperture and the lens mount is unlocked for removal from the camera.

Figure 1:
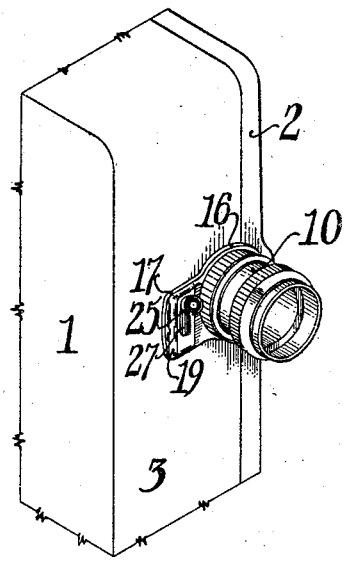
Figure 2:
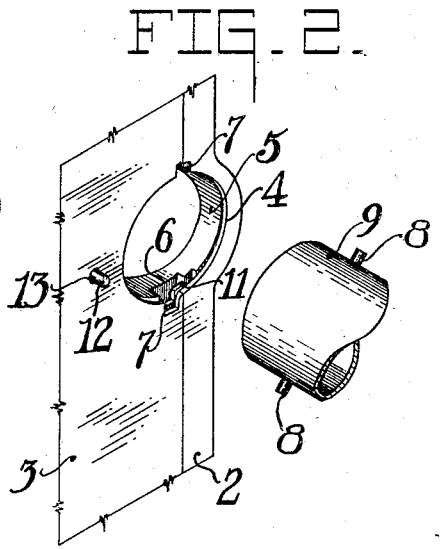
Figure 3:
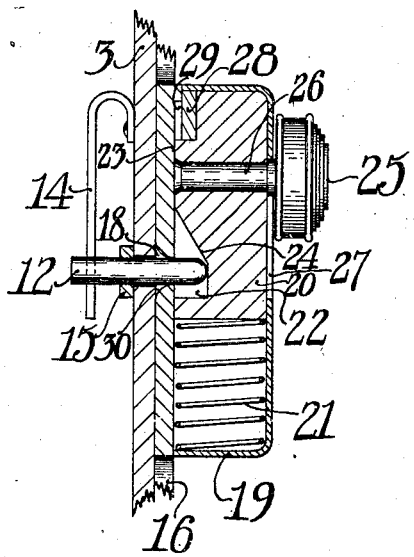

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the following drawing in which;

Figure 1 is a perspective view showing parts of a camera equipped with an objective carried by a removable mount having a latch constructed in accordance with and embodying a preferred form of my invention, Figure 2 is a perspective view of a portion of the front camera wall and a portion of the lens mount showing the means of positioning said lens mount in said camera wall, Figure 3 is an enlarged transverse section of the latch and camera wall showing the lens mount in a locked position.

Figure 5:
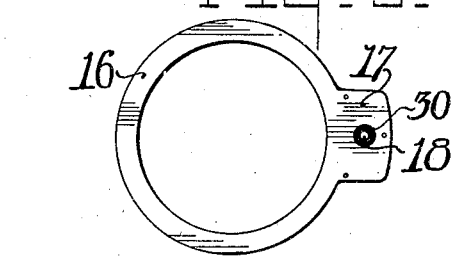
Figure 4:
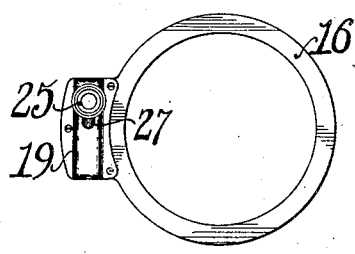

Figure 4 is a front elevation of the base plate and associated latch as a unit separate from the lens mount, Figure 5 is a rear elevation of the base plate showing the aperture therein.

Like reference characters refer to corresponding parts in the drawing.

As illustrated camera 1 is provided with a movable door 2 through which a film can be loaded into or removed from said camera. Front wall 3 of the camera 1 has an aperture 4 behind which is situated a seating ring 5 having a pair of recesses 6 cut into the face thereof, said recesses being diametrically opposite one another. The periphery of the aperture 4 is provided with a pair of suitable slots 7 in axial alignment with the recesses 6 in the seating ring 5, said slots being of a size to accommodate the lugs 8 on the rear lens element 9 of the lens mount 10 and allow said lugs 8 to be seated in the recesses 6. Inasmuch as the slots 7 are narrower than the recesses 6, the lens mount 10 is held in place on the camera front 3 by aligning the lugs 8 on the rear lens element 9 with slots 7, seating said lugs in the recesses 6, and giving the lens mount a partial rotation to throw said lugs 8 out of alignment with the slots 7.

In order to properly position the lens mount so that the lens will be in proper focus with the plane of the film strip moving through the gate of the camera when said lens mount is inserted in the seating ring 5, the resilient member 11 is fixed to the seating ring 5 in such a way that it acts as an abutting means for the lugs 8 on the lens mount when the lugs are rotated in the recesses 6, and the resilient member 11 constantly forces said lens mount rearwardly, thereby tightly abutting it against a definitely positioned flange in the seating ring 5, which is not shown.

A plunger 12 extends through an aperture 13 in the front wall 3 of the camera, and is normally spring pressed forward by means of a spring 14, one end of which is fastened to the inside of the camera wall, as shown in Figure 3, while the other end passes through a hole in the plunger. Plunger 12 is provided with a collar 15 which is fixed thereto for the purpose of limiting the extent to which a plunger can extend through the camera wall 3.

A base plate 16 is permanently fixed to the removable lens mount 10 in any suitable manner. The base plate 16 is provided with a wing portion 17 of suitable dimensions to cover the spring plunger 12 when the lens mount is mounted on the camera. And this wing portion 17 is provided with an aperture 18 through which spring plunger 12 is adapted to extend in order to positively lock the lens mount 10 against rotation with respect to its mounting means in camera wall 3.

A casing 19 is mounted on the wing portion 17 of the base plate 16 in covering relation with the aperture 18 therein, and within said casing a suitable block 20 is slidably mounted. The block 20 is normally forced to the upper end of the casing 19 by a spring 21, as shown in Figure 3. And that portion of the block 20 opposite the aperture 18, when the block is in the position shown, is provided with a recess 22 whose dimensions are such as to permit the plunger 12 to extend into the aperture 18 and into the casing 19, in which position the lens mount is positively locked on the camera front against rotation and subsequent removal therefrom.

The upper portion of the block 20 is made to completely fill casing 19 so that the face 23 thereof lies flush with the face of the base plate, and this portion of the block is connected to the base of the recess 22 by a cam surface 24 which acts to cam the plunger 12 out of the aperture 18 when said block is slid downward against the spring pressing means 21. A sliding of the block 20, to the releasing position, is accomplished by pressing the button 25 which is fastened to the block by means of a pin 26 passing therethrough, said pin extending through slot 27 in the wall of the casing 19. A stop member 28 is mounted on the inside of the casing 19 to engage in notch 29 in top of the block 20 so that as the block is forced to its raised position by the spring 21 it is properly stopped, and the shock of the stopping is taken by the stop member 28 instead of being transmitted across the entire upper surface of the casing 19.

Inasmuch as the plunger 12 is only adapted to be cammed out of the aperture 18 to the point where its tip is flush with the inside wall of the base plate, the complete expulsion of said plunger is accomplished by having the outside edge of the aperture 18 chamfered or rounded, as shown at 30, to act against the rounded end of the plunger 12 and completely cam said plunger from engagement with the aperture 18 as the base plate is rotated on the camera front to effect its removal therefrom. Chamfering of the aperture 18 as shown at 30, also facilitates the admission of the plunger 12 into said aperture when the lens mount 10 is positioned on the camera.

This latch means provides a simple and efficient means for releasing this type of removable lens mount from locking engagement with the camera as well as giving the lens mount and the locking means therefore a finished appearance which is lacking when the plunger is merely allowed to extend through an uncovered aperture in the base plate, in which case the expulsion of the plunger has to be effected by the finger. The incorporation of this type of latching means also reduces the chance of accidentally depressing the plunger or defacing its contour, in which case its proper function might be impaired.

Although I have shown and described certain specific embodiments of my invention, I am fully aware that many modifications thereof are possible. My invention, therefore, is not to be restricted except insofar as necessitated by the prior art and the spirit of the appended claims.

Having thus described my invention, what I declare as new and desire to secure by Letters Patent of the United States is:

1. In a lens mounting for photographic cameras, the combination with a support provided with an opening, a spring pressed member extending through said support adjacent said opening, a removable lens mount adapted to extend into said opening in the support when mounted thereon, cooperating means on the support adjacent said opening and on the lens mount whereby the lens mount in one position can be inserted into the opening and can be locked against removal therefrom upon displacement from said position, a base plate on said lens mount and having an aperture adapted to receive said spring pressed member in the locked position of the mount, of a suitable means mounted on said base plate adjacent said aperture and adapted to expel said spring pressed member from the aperture prior to unlocking the lens mount with respect to the support.

2. In a lens mounting for photographic cameras, the combination with a support provided with an opening, a spring pressed member extending through said support adjacent said opening, a removable lens mount adapted to extend into said opening in the support when mounted thereon, cooperating means on the support adjacent said opening and on the lens mount whereby the lens mount in one position can be inserted into the opening and can be locked against removal therefrom upon displacement from said position, a base plate on said lens mount and having an aperture adapted to receive said spring pressed member in the locked position of the mount, of a releasing means movably mounted between two positions on said base plate over the aperture therein whereby movement of said releasing means into one position expels the spring pressed member from the aperture.

3. In a lens mounting for photographic cameras, the combination with a support provided with an opening, a spring pressed plunger extending through said support adjacent said opening, a removable lens mount adapted to extend into said opening in the support when mounted thereon, cooperating means on the support adjacent said opening and on the lens mount whereby the lens mount in one position can be inserted into the opening and can be locked against removal therefrom upon displacement from said position, a base plate on said lens mount and having an aperture adapted to receive said plunger in the locked position of the mount, of a releasing means slidably mounted on the base plate over the aperture therein and capable of two positions, one position wherein the plunger is allowed to extend through said aperture, and a second position wherein the plunger is expelled from the aperture.

4. In a lens mounting for photographic cameras, the combination with a support provided with an opening, a spring pressed plunger extending through said support adjacent said opening, a removable lens mount adapted to extend into said opening in the support when mounted thereon, cooperating means on the support adjacent said opening and on the lens mount whereby the lens mount in one position can be inserted into the opening and can be locked against removal therefrom upon displacement from said position, a base plate on said lens mount and having an aperture adapted to receive said plunger in the locked position of the mount, of a cam faced member slidably mounted on the base plate and adapted in one position to permit the plunger to enter the aperture in the base plate, and in another position to cam said plunger from said aperture.

5. In a lens mounting for photographic cameras, the combination with a support provided with an opening, a spring pressed plunger extending through said support adjacent said opening, a removable lens mount adapted to extend into said opening in the support when mounted thereon, cooperating means on the support adjacent said opening and on the lens mount whereby the lens mount in one position can be inserted into the opening and can be locked against removal therefrom upon displacement from said position, a base plate on said lens mount and having an aperture adapted to receive said plunger in the locked position of the mount, of a cam faced member slidably mounted on the base plate over the aperture therein and capable of two positions, one wherein said plunger is permitted to enter the aperture, and a second wherein the plunger is cammed out of said aperture.

6. In a lens mounting for photographic cameras, the combination with a support provided with an opening, a spring pressed plunger extending through said support adjacent said opening, a removable lens mount adapted to extend into said opening in the support when mounted thereon, cooperating means on the support adjacent said opening, and on the lens mount whereby the lens mount in one position can be inserted into the opening and can be locked against removal therefrom upon displacement from said position, a base plate on said lens mount and having an aperture adapted to receive said plunger in the locked position of the mount, of a latch member on said base plate comprising a casing covering the aperture in the base plate, a cam faced block slidably mounted in said casing between two positions, a locking position wherein the plunger is allowed to extend through the base plate, and an unlocking position wherein the plunger is cammed out of the aperture in the base plate, resilient means normally forcing said block to its locking position, and suitable means connected to the cam faced block and extending to the outside of the casing for sliding the block to cam the plunger from the aperture in the base plate prior to unlocking the lens mount from the support.

VICTOR V. COLAIACE.